United States Patent
Shu et al.

(10) Patent No.: US 9,532,307 B2
(45) Date of Patent: Dec. 27, 2016

(54) NETWORK DISCOVERY METHOD, ACCESS POINT, AND TERMINAL DEVICE

(71) Applicant: Huawei Device Co., LTD, Shenzhen (CN)

(72) Inventors: Guiming Shu, Shenzhen (CN); Zhiming Ding, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 445 days.

(21) Appl. No.: 13/864,031

(22) Filed: Apr. 16, 2013

(65) Prior Publication Data
US 2013/0308494 A1 Nov. 21, 2013

(30) Foreign Application Priority Data
Apr. 16, 2012 (CN) .......................... 2012 1 0110930

(51) Int. Cl.
*H04W 48/16* (2009.01)
*H04W 52/02* (2009.01)
*H04W 48/08* (2009.01)

(52) U.S. Cl.
CPC ......... *H04W 52/0209* (2013.01); *H04W 48/16* (2013.01); *H04W 52/0229* (2013.01); *H04W 48/08* (2013.01)

(58) Field of Classification Search
None
See application file for complete search history.

(56) References Cited

U.S. PATENT DOCUMENTS

| 7,224,970 | B2 | 5/2007 | Smith et al. |
| 2008/0165738 | A1 | 7/2008 | Barber |
| 2010/0046367 | A1* | 2/2010 | Vermani et al. ............... 370/230 |
| 2010/0303001 | A1* | 12/2010 | Tamura ................. H04W 88/06 370/315 |
| 2011/0103264 | A1* | 5/2011 | Wentink ......................... 370/255 |
| 2011/0134816 | A1* | 6/2011 | Liu et al. ....................... 370/310 |
| 2012/0028671 | A1* | 2/2012 | Niu et al. ....................... 455/522 |
| 2012/0259688 | A1 | 10/2012 | Kim |
| 2013/0166759 | A1* | 6/2013 | Rajamani et al. ............. 709/227 |

(Continued)

FOREIGN PATENT DOCUMENTS

| CN | 101569226 A | 10/2009 |
| CN | 101754422 A | 6/2010 |

(Continued)

OTHER PUBLICATIONS

International Search Report received in Application No. PCT/CN2013/074197, mailed Jul. 25, 2013, 11 pages.

*Primary Examiner* — Duc Duong
(74) *Attorney, Agent, or Firm* — Slater Matsil, LLP (57) ABSTRACT

Embodiments of the present invention disclose a network discovery method, an access point, and a terminal device, and relate to the field of communication technologies. The method includes: generating, by an access point, a physical layer frame, and setting indication information in a frame header part of the physical layer frame, where the indication information is used for indicating that the physical layer frame carries a network discovery message; and sending, by the access point, the physical layer frame. The present invention is applicable to a scenario where the terminal device is connected to the access point by using a WiFi network.

18 Claims, 4 Drawing Sheets

(56) References Cited

U.S. PATENT DOCUMENTS

| | | | |
|---|---|---|---|
| 2013/0176897 A1* | 7/2013 | Wang et al. | 370/254 |
| 2014/0185506 A1* | 7/2014 | Yang et al. | 370/311 |
| 2015/0029933 A1* | 1/2015 | Park | H04W 68/005 370/328 |

FOREIGN PATENT DOCUMENTS

| | | |
|---|---|---|
| CN | 101998267 A | 3/2011 |
| CN | 102256334 A | 11/2011 |
| EP | 2337305 A2 | 6/2011 |
| WO | 2008136600 A1 | 11/2008 |
| WO | 2011074812 A2 | 6/2011 |
| WO | 2011074814 A2 | 6/2011 |

\* cited by examiner

NETWORK DISCOVERY METHOD, ACCESS POINT, AND TERMINAL DEVICE

CROSS-REFERENCE TO RELATED APPLICATION

This application claims priority to Chinese Patent Application No. 201210110930.3, filed on Apr. 16, 2012, which is hereby incorporated by reference in its entirety.

FIELD OF THE INVENTION

The present invention relates to the field of communication technologies, and in particular, to a network discovery method, an access point, and a terminal device.

BACKGROUND OF THE INVENTION

The IEEE (Institute of Electrical and Electronics Engineers, Institute of Electrical and Electronics Engineers) 802.11 standard puts forward a wireless sensor network application scenario powered by batteries. This application scenario imposes higher requirements on a power saving feature of a WiFi (Wireless Fidelity, wireless fidelity) terminal. In the current standard, a terminal not associated with an AP (Access Point) needs to receive all physical layer frames on a monitored channel when discovering a WiFi network. Each physical layer frame is composed of a frame header part and a data part. The terminal receives the physical layer frames on the monitored channel, and parses the physical layer frames to determine which physical layer frame carries a network discovery message, that is, the data part of which physical layer frame includes a MAC (Medium Access Control, medium access control) layer frame applicable to network discovery, such as a Beacon frame or a Probe response frame, so that the terminal can obtain WiFi access point information therefrom.

In the process of implementing the present invention, the inventor finds that the prior art has at least the following problems:

When performing network discovery, the terminal unassociated with the AP needs to parse all physical layer frames on the monitored channel, and needs to parse the frame header part and the data part. Only when the data part of the physical layer frame is parsed and the MAC (Medium Access Control, medium access control) layer data included therein is obtained, the terminal can judge whether the data part of the physical layer frame includes a MAC layer frame applicable to network discovery, thereby determining whether the physical layer frame is a physical layer frame that carries a network discovery message and is used for network discovery. Therefore, when the terminal unassociated with the AP performs network discovery, the process of parsing the data part of physical layer frames that include no network discovery message consumes much power.

SUMMARY OF THE INVENTION

Embodiments of the present invention provide a network discovery method, an access point, and a terminal device which can solve a problem of power waste caused by a terminal for parsing a data part of physical layer frames that include no network discovery message when the terminal unassociated with an AP performs network discovery in a WiFi wireless network discovery process, so as to save power of the terminal.

The embodiments of the present invention adopt the following technical solutions:

A network discovery method includes:

generating, by an access point, a physical layer frame, and setting indication information in a frame header part of the physical layer frame, where the indication information is used for indicating that the physical layer frame carries a network discovery message; and sending, by the access point, the physical layer frame.

A network discovery method includes:

receiving, by a terminal device, a physical layer frame sent by an access point;

parsing, by the terminal device, a frame header part of the physical layer frame, and determining whether the frame header part of the physical layer frame includes indication information, where the indication information is used for indicating that the physical layer frame carries a network discovery message; and parsing, by the terminal STA, a data part of the physical layer frame to obtain access point information included in the network discovery message if the frame header part of the physical layer frame includes the indication information; and, stopping, by the terminal STA, parse of the data part of the physical layer frame if the frame header part of the physical layer frame does not include the indication information.

An access point includes:

a frame processing unit, configured to generate a physical layer frame, and set indication information in a frame header part of the physical layer frame, where the indication information is used for indicating that the physical layer frame carries a network discovery message; and a sending unit, configured to send the physical layer frame.

A terminal device includes:

a receiving unit, configured to receive a physical layer frame sent by an access point;

a parsing unit, configured to parse a frame header part of the physical layer frame, and determine whether the frame header part of the physical layer frame includes indication information, where the indication information is used for indicating that the physical layer frame carries a network discovery message; and a processing unit, configured to parse a data part of the physical layer frame to obtain access point information included in the network discovery message if the frame header part of the physical layer frame includes the indication information; and, stop parse of the data part of the physical layer frame if the frame header part of the physical layer frame does not include the indication information.

Compared with the prior art, the embodiments of the present invention use an access point AP to set indication information in a frame header part of a physical layer frame to indicate that the physical layer frame carries a network discovery message and broadcast the indication information to a terminal; after receiving the physical layer frame, a terminal unassociated with the AP needs only to parse a frame header part of the physical layer frame, and determine whether the physical layer frame carries the network discovery message according to the indication information; if it is determined that the physical layer frame carries the network discovery message, the terminal continues to parse a data part of the physical layer frame to obtain the network discovery message; or if it is determined that the physical layer frame does not carry the network discovery message, the terminal does not continue to parse the data part of the physical layer frame. In this way, it is avoided that the terminal unassociated with the AP does not know whether the physical layer frame is a physical layer frame used for network discovery until the data part of the physical layer frame is parsed, and it is not necessary to parse the data part of the physical layer frame that includes no network discovery message, so that power consumed for parsing the data part of the physical layer frame is saved, and power is saved for the terminal.

BRIEF DESCRIPTION OF THE DRAWINGS

To describe the technical solutions in the embodiments of the present invention more clearly, the accompanying drawings required for describing the embodiments are briefly introduced in the following. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

To make the advantages of the technical solutions of the present invention more comprehensible, the present invention is described in detail with reference to the accompanying drawings and embodiments.

Embodiment 1

Figure 1:
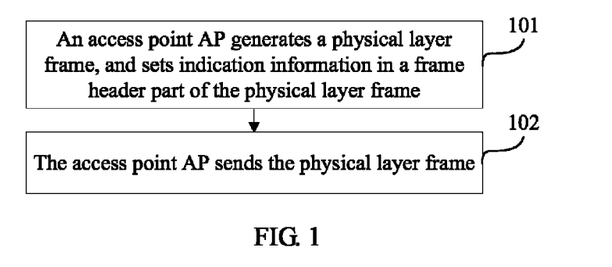
FIG. 1 is a flowchart of a method according to Embodiment 1 of the present invention.

This embodiment provides a network discovery method. As shown in FIG. 1, the method includes the following:

101. An access point AP generates a physical layer frame, and sets indication information in a frame header part of the physical layer frame.

The indication information is used for indicating that the physical layer frame carries a network discovery message. Specifically, a data part of the physical layer frame carries a network discovery message. The indication information occupies one or more bits in the frame header part of the physical layer frame. The physical layer frame generated by the access point AP is a physical layer frame whose data part includes a network discovery message applicable to network discovery. The network discovery message refers to a MAC layer frame used for a terminal STA to perform network discovery, for example, a Beacon frame, a Probe Response frame, an Association Response frame, or an Authentication frame. The network discovery message may include at least one of the following MAC layer frames: a Beacon frame, a Probe Response frame, an Association Response frame, and an Authentication frame.

For example, the setting, by an access point AP, indication information in a frame header part of the physical layer frame includes: setting, by the access point AP, multiple consecutive bits in the frame header part of the physical layer frame to a determined value, where the value is used for indicating that the physical layer frame carries a network discovery message, and the multiple consecutive bits are multiple binary bits corresponding to a partial association identifier included in the frame header part of the physical layer frame. For example, all nine bits corresponding to the partial association identifier included in the frame header part of the physical layer frame are set to 1; or, the access point AP sets one bit or multiple discrete bits in the frame header part of the physical layer frame to a determined value, where the value is used for indicating that the physical layer frame carries a network discovery message.

102. The access point AP sends the physical layer frame. The access point may broadcast the physical layer frame to the terminal, so that after receiving the physical layer frame, the terminal that performs network discovery parses the physical layer frame and knows that the frame header part of the physical layer frame includes indication information, where the indication information indicates that the data part of the physical layer frame carries a network discovery message. Therefore, the terminal determines that the physical layer frame is a physical layer frame required by the terminal for performing network discovery, and continues to parse the data part of the physical layer frame to obtain information about a WiFi network or a WiFi access point and implement network discovery.

Compared with the prior art, the embodiment of the present invention uses an access point AP to set indication information in a frame header part of a physical layer frame to indicate that a data part of the physical layer frame carries a network discovery message; the access point broadcasts the physical layer frame to a terminal, so that after receiving the physical layer frame, and by parsing only the frame header part of the physical layer frame, a terminal that performs network discovery can determine whether the physical layer frame is a physical layer frame required by the terminal for performing network discovery, and determine whether to continue to parse the data part of the physical layer frame to obtain information about a WiFi network or a WiFi access point. In this way, the process of network discovery is implemented with less power consumption.

Embodiment 2

Figure 2:
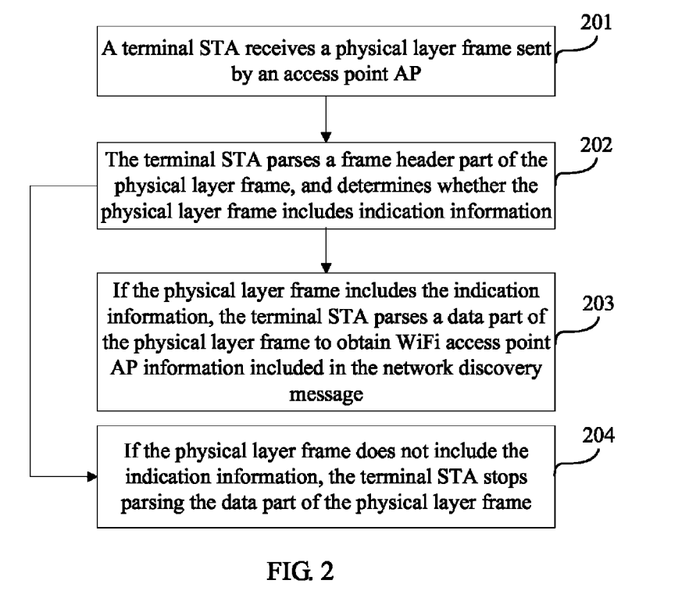
FIG. 2 is a flowchart of a method according to Embodiment 2 of the present invention.

This embodiment provides a network discovery method. As shown in FIG. 2, the method includes the following:

201. A terminal STA (Station, station) receives a physical layer frame sent by an access point AP.

202. The terminal STA parses a frame header part of the physical layer frame, and determines whether the physical layer frame includes indication information.

The indication information is used for indicating that the physical layer frame carries a network discovery message. The network discovery message refers to a MAC layer frame used for the terminal STA to perform network discovery, for example, a Beacon frame, a Probe Response frame, an Association Response frame, or an Authentication frame.

203. If the physical layer frame includes the indication information, the terminal STA parses a data part of the physical layer frame to obtain access point AP information included in the network discovery message. The access point information may be included in at least one MAC layer frame among the Beacon frame, the Probe Response frame, the Association Response frame, and the Authentication frame.

204. If the physical layer frame does not include the indication information, the terminal STA stops parsing the data part of the physical layer frame.

The access point AP may be a WiFi access point AP.

It should be noted that "the physical layer frame does not include the indication information" means that the frame header part of the physical layer frame does not include any information used for indicating that the physical layer frame carries or includes a network discovery message. When a physical layer frame includes no network discovery message, indication information set by the access point AP also exists in corresponding bits in the frame header part of the physical layer frame, where the corresponding bits correspond to the frame header part of the physical layer frame that includes a network discovery message, but the indication information is not used for indicating that the physical layer frame includes a network discovery message.

For a physical layer frame that does not include the indication information, the terminal STA stops parsing a remaining data part of the physical layer frame, thereby saving power consumed for parsing the data part of the physical layer frame that includes no network discovery message.

Compared with the prior art, a terminal in the embodiment of the present invention needs only to parse a frame header part of a physical layer frame after receiving the physical layer frame. If the frame header part of the physical layer frame indicates that the physical layer frame includes a network discovery message, the terminal continues to parse a data part of the physical layer frame to obtain access point AP information included in the network discovery message; if the frame header part of the physical layer frame indicates that the physical layer frame does not include the network discovery message, the terminal does not continue to parse the data part of the physical layer frame. In this way, it is avoided that the terminal in the prior art does not know whether the physical layer frame includes a MAC layer frame applicable to network discovery (whether the physical layer frame includes a network discovery message) until the data part of the physical layer frame is parsed, and power consumed for parsing the data part of the physical layer frame is saved.

Embodiment 3

Figure 3:
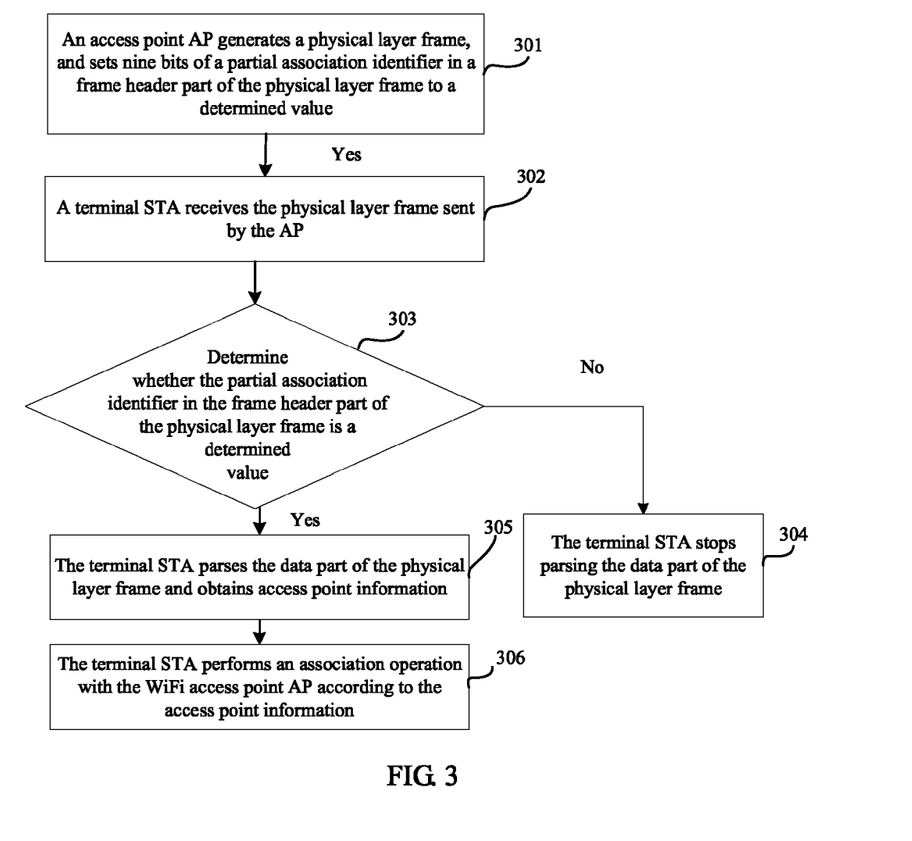
FIG. 3 is a flowchart of a method according to Embodiment 3 of the present invention.

This embodiment provides a network discovery method. As shown in FIG. 3, the method includes the following:

301. An access point AP generates a physical layer frame, and sets nine bits of a partial association identifier in a frame header part of the physical layer frame to a determined value. The physical layer frame generated by the access point AP is a physical layer frame whose data part includes a network discovery message applicable to network discovery.

Specifically, the access point AP generates the physical layer frame, and sets the nine bits of the partial association identifier in the frame header part of the physical layer frame to a determined value.

The determined value is used for indicating that the data part of the physical layer frame carries a network discovery message, and the network discovery message includes at least one of the following medium access control layer MAC layer frames: a Beacon frame, a Probe Response frame, an Association Response frame, and an Authentication frame. Each physical layer frame is composed of a frame header part and a data part. The frame header part includes fields such as L-STF, L-LTF, L-SIG, VHT-SIG-A, VHT-STF, VHT-LTF, and VHT-SIG-B.

For example, setting nine bits of a partial association identifier in a frame header part of the physical layer frame to a determined value may be: setting the nine bits corresponding to a partial association identifier (partial association identifier, that is, Partial Association Identifier, or Partial AID) included in an SIG field that includes the partial association identifier in the frame header part of the physical layer frame to a determined value such as 111111111, where the value is used for indicating that the physical layer frame carries a network discovery message, that is, all the nine bits corresponding to the partial association identifier included in the frame header part of the physical layer frame are set to 1.

302. A terminal STA receives the physical layer frame sent by the access point AP.

303. The terminal STA parses the frame header part of the physical layer frame and determines whether the partial association identifier in the frame header part of the physical layer frame is a determined value. If the partial association identifier in the frame header part of the physical layer frame is not a determined value, step 304 is executed; if the partial association identifier in the frame header part of the physical layer frame is a determined value, steps 305 and 306 are executed.

For example, the terminal STA determines whether the value of the partial association identifier in the frame header part of the physical layer frame obtained through parsing is 111111111; if the value of the partial association identifier is 111111111, the terminal STA continues to parse the data part of the physical layer frame, to obtain a network discovery message included in it, and further to obtain access point AP information included in the network discovery message; if the value of the partial association identifier is not 111111111, the terminal STA stops parsing the remaining data part of the physical layer frame to save power.

304. The terminal STA stops parsing the data part of the physical layer frame.

If the value of the partial association identifier included in the frame header part of the physical layer frame is not 111111111, the terminal STA stops parsing the remaining data part of the physical layer frame, thereby saving power consumed for parsing the remaining data part of the physical layer frame.

305. The terminal STA parses the data part of the physical layer frame, and obtains access point AP information included in the network discovery message in the data part. In this way, the terminal STA implements network discovery. The access point information may be included in at least one MAC layer frame among the Beacon frame, the Probe Response frame, the Association Response frame, and the Authentication frame.

306. The terminal STA performs an association operation with the corresponding access point AP according to the access point AP information.

The access point AP may be a WiFi access point AP.

Compared with the prior art, an access point AP in the embodiment of the present invention sets indication information in a frame header part of a physical layer frame, and assigns a determined value such as 111111111 to nine bits corresponding to a partial association identifier in an SIG field that includes the partial association identifier. This value indicates that a data part of the physical layer frame carries a network discovery message, and the physical layer frame is broadcast to a terminal. After receiving the physical layer frame, the terminal needs only to parse the frame header part of the physical layer frame. If the nine bits of the partial association identifier in the SIG field in the frame header part of the physical layer frame are 111111111, the terminal continues to parse the data part of the physical layer frame to obtain the access point AP information included in a network discovery message carried in the data part; if the nine bits of the partial association identifier in the SIG field in the frame header part of the physical layer frame are not 111111111, the terminal does not continue to parse the data part of the physical layer frame. In this way, it is avoided that the terminal in the prior art does not know whether the physical layer frame includes a MAC layer frame applicable to network discovery until the data part of the physical layer frame is parsed, and power consumed for parsing the data part of the physical layer frame is saved.

Embodiment 4

Figure 4:
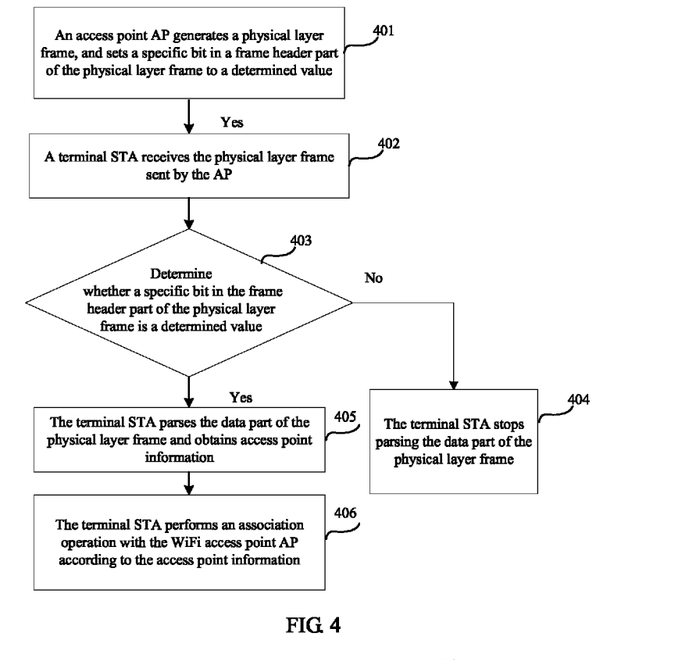
FIG. 4 is a flowchart of a method according to Embodiment 4 of the present invention.

This embodiment provides a network discovery method. As shown in FIG. 4, the method includes the following:

401. An access point AP generates a physical layer frame, and sets a specific bit in a frame header part of the physical layer frame to a determined value. The physical layer frame generated by the access point AP is a physical layer frame whose data part includes a network discovery message applicable to network discovery.

Specifically, the access point AP generates the physical layer frame, and sets the nine bits of the partial association identifier in the frame header part of the physical layer frame to a determined value.

The determined value is used for indicating that the physical layer frame carries a network discovery message, and the network discovery message includes at least one of the following medium access control layer MAC layer frames: a Beacon frame, a Probe Response frame, an Association Response frame, and an Authentication frame. Each physical layer frame is composed of a frame header part and a data part. The frame header part includes fields such as L-STF, L-LTF, L-SIG, VHT-SIG-A, VHT-STF, VHT-LTF, and VHT-SIG-B. The L-SIG field and the VHT-SIG-A field include unused reserved bits such as B4 bit in L-SIG, B2 bit and B23 bit in VHT-SIG-A. Such reserved bits may be used to set new values for indicating that the physical layer frame serves a purpose of network discovery.

For example, a value of either the B2 bit or the B23 bit of the VHT-SIG-A field in the frame header part of the physical layer frame is set to 0 (herein the value "0" indicates that the data part of the physical layer frame includes a network discovery message, or, the bit may be set to 1 as stipulated). The value is used for indicating that the data part of the physical layer frame carries a network discovery message. Optionally, the value of the B4 bit in the L-SIG is set to 0 (herein, the value "0" indicates that the data part of the physical layer frame includes a network discovery message, or, the bit may be set to 1 as stipulated). The value is used for indicating that the physical layer frame carries a network discovery message.

It should be noted that setting a bit in the frame header part of the physical layer frame to a determined value is a preferred solution of the present invention. In fact, because the B4 bit in the L-SIG and the B2 bit and B23 bit in the VHT-SIG-A are reserved bits, at least one of the three bits may be set to a determined value. Therefore, the combinations of setting any of the three bits, that is, the B4 bit in the L-SIG and the B2 bit and B23 bit in the VHT-SIG-A, to a determined value, are covered in the protection scope of the present invention.

402. A terminal STA receives the physical layer frame sent by the access point AP.

403. The terminal STA parses the frame header part of the physical layer frame and determines whether a specific bit in the frame header part of the physical layer frame is a determined value. If the specific bit in the frame header part of the physical layer frame is not a determined value, step 404 is executed; if the specific bit in the frame header part of the physical layer frame is a determined value, steps 405 and 406 are executed.

For example, if the terminal STA determines that either the B4 bit in the L-SIG or one of the B2 bit and B23 bit in the VHT-SIG-A in the frame header part of the physical layer frame is 0, the terminal STA continues to parse the data part of the physical layer frame, and obtains access point AP information in the data part; if neither the B4 bit in the L-SIG nor any one of the B2 bit and B23 bit in the VHT-SIG-A is 0, the terminal STA stops parsing the remaining data part of the physical layer frame.

404. The terminal STA stops parsing the data part of the physical layer frame.

If the specific bit in the frame header part of the physical layer frame is not a determined value, the terminal STA stops parsing the remaining data part of the physical layer frame, thereby saving power consumed for parsing the remaining data part of the physical layer frame.

405. The terminal STA parses the data part of the physical layer frame, and obtains access point AP information included in the network discovery message in the data part. The access point information may be included in at least one MAC layer frame among the Beacon frame, the Probe Response frame, the Association Response frame, and the Authentication frame.

406. The terminal STA performs an association operation with the access point AP according to the access point AP information.

Compared with the prior art, an access point AP in the embodiment of the present invention sets indication information in a frame header part of a physical layer frame, and sets either B4 bit in an L-SIG field or one of B2 bit and B23 bit in a VHT-SIG-A field in the frame header part to 0. This value indicates that a data part of the physical layer frame carries a network discovery message, and the physical layer frame is broadcast to a terminal. After receiving the physical layer frame, the terminal needs only to parse the frame header part of the physical layer frame. If the value of either the B4 bit in the L-SIG field or one of the B2 bit and the B23 bit in the VHT-SIG-A field in the frame header part of the physical layer frame is 0, the terminal continues to parse the data part of the physical layer frame to obtain the access point AP information; if the value of neither the B4 bit in the L-SIG field nor any one of the B2 bit and the B23 bit in the VHT-SIG-A field is 0, the terminal does not continue to parse the remaining data part of the physical layer frame. In this way, it is avoided that the terminal in the prior art does not know whether the physical layer frame includes a MAC layer frame applicable to network discovery until the data part of the physical layer frame is parsed, and power consumed for parsing the data part of the physical layer frame is saved.

Embodiment 5

Figure 5:
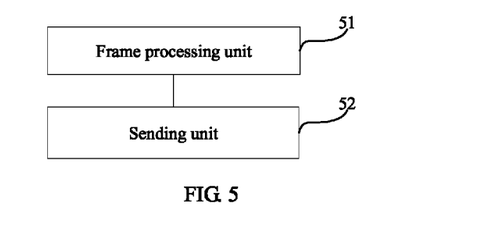
FIG. 5 and FIG. 6 are schematic structural diagrams of an access point according to Embodiment 5 of the present invention.

This embodiment provides an access point AP. As shown in FIG. 5, the access point AP includes:

a frame processing unit 51, configured to generate a physical layer frame, and set indication information in a frame header part of the physical layer frame, where the indication information is used for indicating that the physical layer frame carries a network discovery message, and the physical layer frame generated by the frame processing unit 51 is a physical layer frame whose data part includes a network discovery message applicable to network discovery; and a sending unit 52, configured to send the physical layer frame.

The network discovery message includes at least one of the following medium access control MAC layer frames: a Beacon frame, a Probe Response frame, an Association Response frame, and an Authentication frame. The indication information occupies one or more bits in the frame header part of the physical layer frame.

Figure 6:
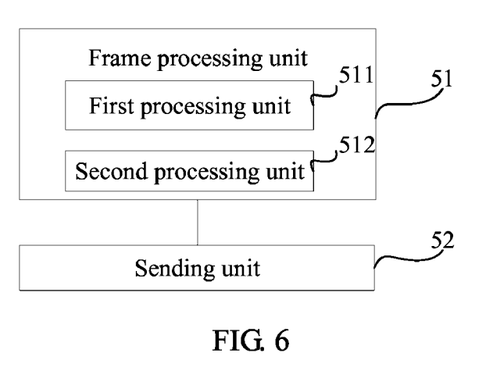

Further, as shown in FIG. 6, the frame processing unit 51 includes:

a first processing unit 511, configured to set multiple consecutive bits in the frame header part of the physical layer frame to a determined value, where the value is used for indicating that the physical layer frame carries a network discovery message; or a second processing unit 512, configured to set one bit or multiple discrete bits in the frame header part of the physical layer frame to a determined value, where the value is used for indicating that the physical layer frame carries a network discovery message.

The multiple consecutive bits are multiple binary bits corresponding to a partial association identifier included in the frame header part of the physical layer frame.

The first processing unit 511 is specifically configured to set all nine bits corresponding to the partial association identifier included in the frame header part of the physical layer frame to 1.

The access point AP may be a WiFi access point AP.

Compared with the prior art, the embodiment of the present invention uses a WiFi access point AP to set indication information in a frame header part of a physical layer frame to indicate that a data part of the physical layer frame carries a network discovery message; the access point broadcasts the physical layer frame to a terminal, so that after receiving the physical layer frame, and by parsing only the frame header part of the physical layer frame, a terminal that performs network discovery can determine whether the physical layer frame is a physical layer frame inclusive of a network discovery message and required by the terminal for performing network discovery, and determine whether to continue to parse the data part of the physical layer frame to obtain information about a WiFi network or a WiFi access point. In this way, the process of network discovery is implemented with less power consumption.

Embodiment 6

Figure 7:
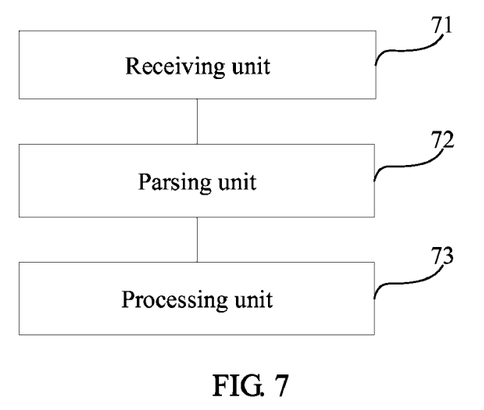
FIG. 7 is a schematic structural diagram of a terminal device according to Embodiment 6 of the present invention.

This embodiment provides a terminal device. As shown in FIG. 7, the terminal device includes:

a receiving unit 71, configured to receive a physical layer frame sent by an access point AP;

a parsing unit 72, configured to parse a frame header part of the physical layer frame, and determine whether the frame header part of the physical layer frame includes indication information, where the indication information is used for indicating that the physical layer frame carries a network discovery message; and a processing unit 73, configured to parse a data part of the physical layer frame to obtain access point AP information included in the network discovery message if the frame header part of the physical layer frame includes the indication information; and, stop parse of the data part of the physical layer frame if the frame header part of the physical layer frame does not include the indication information.

The access point AP may be a WiFi access point AP.

Compared with the prior art, a terminal in the embodiment of the present invention needs only to parse a frame header part of a physical layer frame after receiving the physical layer frame. If the frame header part of the physical layer frame indicates that the physical layer frame includes a network discovery message, the terminal continues to parse a data part of the physical layer frame to obtain access point AP information; if no network discovery message is included, the terminal does not continue to parse the remaining data part of the physical layer frame. In this way, it is avoided that the terminal in the prior art does not know whether the physical layer frame includes a MAC layer frame applicable to network discovery until the data part of the physical layer frame is parsed, and power consumed for parsing the data part of the physical layer frame is saved.

The access point and the terminal device provided in the embodiments of the present invention can implement the method embodiment provided above. For the detailed function implementation, reference may be made to the description in the method embodiment, and no repeated description is given herein. The network discovery method, the access point, and the terminal device provided in the embodiments of the present invention are applicable but not limited to a scenario where the terminal device is connected to an access point by using a WiFi network.

Persons of ordinary skill in the art may understand that all or a part of the processes of the methods in the embodiments may be implemented by a computer program instructing relevant hardware. The program may be stored in a computer readable storage medium. When the program is run, the flows of the methods in the embodiments are included. The storage medium may be a magnetic disk, an optical disk, a read-only memory (Read-Only Memory, ROM), or a random access memory (Random Access Memory, RAM) or the like.

The foregoing descriptions are merely specific embodiments of the present invention, but are not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

What is claimed is:

1. A network discovery method, comprising:
generating, by an access point, a physical layer frame, the generating the physical layer frame comprising setting indication information in a frame header part of the physical layer frame, wherein the indication information is used to indicate whether the physical layer frame carries a network discovery message applicable to network discovery; and sending, by the access point, the physical layer frame, so that a terminal device receiving the physical layer frame parses the frame header part of the physical layer frame and determines whether the physical layer frame carries the network discovery message according to the indication information, wherein the terminal device parses a data part of the physical layer frame to obtain the network discovery message in response to determining that the physical layer frame carries the network discovery message and wherein the terminal device does not parse the data part of the physical layer frame in response to determining that the physical layer frame does not carry the network discovery message.

2. The method according to claim 1, wherein the network discovery message comprises a medium access control layer frame selected from the group consisting of a beacon frame, a probe response frame, an association response frame, and an authentication frame.

3. The method according to claim 1, wherein the indication information occupies one or more bits in the frame header part of the physical layer frame.

4. The method according to claim 1, wherein setting the indication information in the frame header part of the physical layer frame comprises setting, by the access point, multiple consecutive bits in the frame header part of the physical layer frame to a determined value, wherein the determined value is used to indicated that the physical layer frame carries the network discovery message.

5. The method according to claim 4, wherein the multiple consecutive bits are multiple binary bits corresponding to a partial association identifier comprised in the frame header part of the physical layer frame.

6. The method according to claim 5, wherein setting multiple consecutive bits to the determined value comprises setting nine bits corresponding to the partial association identifier comprised in the frame header part of the physical layer frame to 1.

7. The method according to claim 1, wherein setting the indication information in the frame header part of the physical layer frame comprises setting, by the access point, one bit or multiple discrete bits in the frame header part of the physical layer frame to a determined value, wherein the determined value is used for indicating that the physical layer frame carries the network discovery message.

8. A network discovery method, comprising:

receiving, by a terminal device, a physical layer frame sent by an access point, wherein indication information is set in a frame header part of the physical layer frame, the indication information used to indicate whether the physical layer frame carries a network discovery message applicable to network discovery;

parsing, by the terminal device, the frame header part of the physical layer frame;

determining whether the physical layer frame carries the network discovery message according to the indication information;

parsing, by the terminal device, a data part of the physical layer frame to obtain the network discovery message in response to determining that the physical layer frame carries the network discovery message; and not parsing, by the terminal device, the data part of the physical layer frame in response to determining that the physical layer frame does not carry the network discovery message.

9. The method according to claim 8, wherein the network discovery message comprises a medium access control layer frame selected from the group consisting of a beacon frame, a probe response frame, an association response frame, and an authentication frame.

10. The method according to claim 8, wherein the indication information occupies one or more bits in the frame header part of the physical layer frame.

11. An access point device, comprising:

a processor;

a non-transitory computer-readable storage medium storing a program to be executed by the processor, the program including instructions for:

generating a physical layer frame, the generating the physical layer frame comprising setting indication information in a frame header part of the physical layer frame, wherein the indication information is used to indicate whether the physical layer frame carries a network discovery message applicable to network discovery; and a transmitter, configured to send the physical layer frame, so that a terminal device receiving the physical layer frame parses the frame header part of the physical layer frame and determines whether the physical layer frame carries the network discovery message according to the indication information, wherein the terminal device parses a data part of the physical layer frame to obtain the network discovery message in response to determining that the physical layer frame carries the network discovery message and wherein the terminal device does not parse the data part of the physical layer frame in response to determining that the physical layer frame does not carry the network discovery message.

12. The device according to claim 11, wherein the network discovery message comprises a medium access control layer frames selected from the group consisting of a beacon frame, a probe response frame, an association response frame, and an authentication frame.

13. The device according to claim 11, wherein the indication information occupies one or more bits in the frame header part of the physical layer frame.

14. The device according to claim 11, wherein the program further includes instructions for:

setting multiple consecutive bits in the frame header part of the physical layer frame to a determined value, wherein the determined value is used for indicating that the physical layer frame carries the network discovery message.

15. The device according to claim 14, wherein the multiple consecutive bits are multiple binary bits corresponding to a partial association identifier comprised in the frame header part of the physical layer frame.

16. The device according to claim 15, wherein the program further includes instructions for setting all nine bits corresponding to the partial association identifier comprised in the frame header part of the physical layer frame to 1.

17. The device according to claim 11, wherein the program further includes instructions for:

setting one bit or multiple discrete bits in the frame header part of the physical layer frame to a determined value, wherein the determined value is used for indicating that the physical layer frame carries the network discovery message.

18. A terminal device, comprising:

a receiver, configured to receive a physical layer frame sent by an access point, wherein indication information is set in a frame header part of the physical layer frame and wherein the indication information is used to indicate whether the physical layer frame carries a network discovery message applicable to network discovery;

a processor; and a non-transitory computer-readable storage medium storing a program to be executed by the processor, the program including instructions for:

parsing the frame header part of the physical layer frame and determining whether the physical layer frame carries the network discovery message according to the indication information; and parsing a data part of the physical layer frame to obtain the network discovery message in response to determining that the physical layer frame carries the network discovery message and not parsing the data part of the physical layer frame in response to determining that the physical layer frame does not carry the network discovery message.

* * * * *